United States Patent Office 2,861,950
Patented Nov. 25, 1958

2,861,950

METHOD FOR GREASE MANUFACTURE UTILIZING FUSED METALLIC SOAPS

Theodore A. Renshaw, Glenolden, Pa., and Edward R. Lamson, Sewell, N. J.

No Drawing. Application February 28, 1955
Serial No. 491,232

10 Claims. (Cl. 252—32)

(Granted under Title 35, U. S. Code (1952), sec. 266)

The invention described herein may be manufactured and used by or for the Government of the United States of America for governmental purposes without the payment of any royalties thereon or therefor.

This invention relates to the art of making gels with various types of liquids, such as with lubricating oils to form greases and other types of gels made by following the inventive method.

This invention constitutes an improvement over the disclosures in our copending applications, Serial No. 386,411, filed October 15, 1953, and Serial No. 405,263, filed January 20, 1954, both of which teach new methods for making gels with soaps and describe new products made as the result of such improvements.

Methods of forming gels out of soaps include: The heating together of a soap and an oil; extracting the oil from a previously made grease and combining the remaining soap with a new oil, reacting soap making products in a lubricating oil to form a grease. These and other methods with their attendant disadvantages are described in detail on page 2 of our applications Serial Numbers 386,411 and 405,263.

In order to overcome the disadvantages of the methods described above and to provide a method which can be used as a continuous process and is more economical than those previously known in the art, this invention contemplates for an object the use of a fused soap in a gel making process.

Another object of this invention is to provide a novel method for the production of gels wherein no heat is applied during the gelling operation thereby preventing the liquid component from possible loss of quality or effectiveness due to thermal degradation.

Still another object of this invention is to provide a method of making gels wherein a uniform dispersion of the gelling agent is obtained by milling a fused soap into a suitable liquid.

These and other objects and the attendant advantages of this invention will be readily appreciated as the same becomes better understood by reference to the following detailed description.

The instant invention consists basically of two special steps: First, the soap gelling agent is treated by a suitable application of heat so that it passes through a liquid stage and is then cooled. The resultant product is in the form of a very compact mass which can have the appearance of a super-cooled liquid. In any case, the soap gelling agents treated as described above have an obviously different appearance from normal powdered soaps in that they have a translucent non-white appearance. Although some soaps do not pass through a liquid phase when heated but rather develop into semi-fluid plastic masses, this change is sufficient to produce the desired characteristic whereby they manifest good gelling properties when milled into oils.

The second step involves the use of the fused soap, in a suitable particle size, in a mixing operation with a proper proportion of the liquid to be gelled. This mixture is subjected to a mechanical action such as milling so that the desired grease or other gel develops.

The following fused soaps which have been tested and found suitable for use in the inventive methods include: Sodium stearate, lithium stearate, barium stearate, lithium 12-hydroxy stearate, strontium stearate, aluminum mono stearate, lithium palmitate, lithium myristate, lithium laurate, lithium 9,10-dihydroxy stearate, lithium 9,10-difluoro stearate, calcium stearate, mixture of lithium and barium stearate, lithium and sodium stearate, barium and sodium stearate, lithium and calcium stearate, and sodium and calcium stearate.

It has further been found that complex soaps may be used, that is, where the soap is modified by the presence of a salt so that a new compound exists. These compounds are known as soap complexes and are known to have advantages in certain cases over the simple soap itself. Such complexes after being fused as described above form excellent gelling agents.

Media capable of being gelled by the method of this invention cover a wide range of oil types. Some of the more common types are mineral oils and synthetic lubricating oils, especially silicone oils which are normally very difficult to thicken with soap gelling agents. Other liquids which can be thickened by the novel method are vegetable oils, glycerol, certain glycols and glycol polymers, light petroleum distillates and various organic liquids of a more complex nature.

The gels formed as a consequence of the method may be lubricating greases, when a lubricating oil is gelled. A volatile hydrocarbon may be used to form a gel, the hydrocarbon evaporating after the gel is spread on a surface to leave a soap coating. Other media may be gelled for use in a wide range of applications, such as paints and cosmetic formulations.

One form the invention may take involves the mixing of fused soap, which is ground to a suitable size after fusion, with the liquid to be gelled and the mixture is then milled until the desired gel results.

At this point it should be understood that many different types of milling apparatus will be effective in dispersing the fused soaps throughout the liquid phase so that the gel develops. The apparatus used has included a three-roll paint mill, a Morehouse mill and a colloid mill. Each of these devices was used to produce a grease from a mixture of fused soap and oil. The details of the milling technique were not found to be critical except insofar as milling itself is important in the practice of the invention and better milling produces a better product. Milling itself is part of another well defined art and those familiar with it can develop the suitable techniques and modifications of the apparatus necessary in order to obtain optimum efficiency. Factors in the modification of apparatus which should be considered are mill clearances, driving power, rotor-stator design, bypass and return capacities and pumping or production rates.

An example of the first form of the invention and an indication of its advantages over the dry white powdered soaps normally supplied commercially, may be seen by a study of the following description:

All penetration values given herein are Kaufman micro-penetration unless specified otherwise.

*Example I*

Lithium stearate soap was heated by a suitable means until fusion as indicated by the change in physical appearance described above occurred. Four grams of the soap was ground so that which passed a 28 mesh screen and was held on a 42 mesh screen was intermixed with 21 grams of an oil having a viscosity of 65 SUS at 210° F. The mixture was passed through a three roll paint mill three times and resulted in a 16% soda grease having a micro penetration of 88.

By way of comparison a standard lithium stearate soap exactly as obtained from a commercial supplier was mixed with the 65 SUS at 210° F. oil and given 13 passes on the three roll mill. The resultant product was semi fluid and it was impossible to obtain a micro penetration reading.

Other examples of this form of the invention are as follows:

Example II

The soap of Example I ground so that it passed through a 40 mesh screen and was held on a 60 mesh screen was mixed with the same oil and given 2 passes on the mill, yielding a 16% soap base grease having a micropenetration of 110.

Example III

Four grams of fused lithium 12-hydroxystearate which was ground so that it passed through a 20 mesh screen and was held on a 40 mesh screen was mixed with 21 grams of di-2 ethyl hexyl sebacate and after three passes on a three roll mill yielded a 15% soap grease having a micro penetration of 92.

Example IV

Fused sodium stearate was ground so that it passed through a 20 mesh screen and was held on 40 mesh screen and then mixed with petroleum oil having a viscosity of 65 SUS at 210° F. After four passes on a three roll mill a 16% soap grease resulted having a micro penetration of 265.

Example V

Fused strontium stearate was ground so that it passed through a 10 mesh screen and mixed with the oil of Example IV. After four passes on the three roll mill a 16% soap grease having a micro penetration of 340 resulted.

Example VI

Fused barium stearate of the same size as the strontium stearate of Example V was mixed with the oil of Example IV and after four passes on the three roll mill a 16% soap grease having a micro penetration of 289 resulted.

Example VII

Fused aluminum monostearate of a size which had passed through a 10 mesh screen was mixed with lubricating oil of Example IV and after four passes on a three roll paint mill a 16% soap base grease having a micro penetration of 130 resulted.

Example VIII

Fused lithium stearate particles of a size which passed through a 10 mesh screen was mixed with a sufficient amount of a methyl silicone oil, having a viscosity of 189 SUS at 210° F., to make a 16% soap in oil mixture. After three passes on the three roll mill a grease having a micropenetration of 101 resulted.

Gels or greases may be readily made with mixtures of soaps by several methods according to this invention. By one method mixtures of a desired proportion of different fused soaps can be formed into gels or greases by milling with the oil. Quite different gelling characteristics may be realized if the soap mixtures are made prior to fusion and the fused soap mixture milled into a grease or gel.

Example IX

A mixture of 50% by weight of barium stearate and 50% by weight of sodium stearate was fused and then mixed with sufficient oil of Example IV to give a 16% soap in oil mixture.

After three passes on a three roll paint mill a grease having a micro penetration of 250 resulted.

Example X

A mixture of 50% by weight of fused sodium stearate and 50% by weight fused lithium stearate was added to the oil of Example IV to make a 16% soap in oil mixture. After 3 passes in the 3-roll paint mill the sample developed into a grease having a micropenetration of 128.

It may be seen from the foregoing examples that the penetration of greases resulting from following the invention are at least as good or better than grease made by those methods previously known in the art using equivalent percentages of soap. Putting it in more general terms the novel method including the step of first fusing the gelling agent yields a consistently high efficiency of gelation.

An obvious primary advantage of the instant process is that the final grease or gelled liquid is itself never subjected to temperatures appreciably higher than room temperature. Further, the heat used to fuse the soap represents a considerable saving over the amount of heat normally used in previously known thermal processes of making greases and other gels. These processes require that the entire gel load of soap and liquid be raised to high temperatures.

A further advantage of the process is that greases and other gels can be made in a continuous process as the fused soap or gelling agent need only be mixed with the liquid and then worked or milled to yield the final product.

It has been found that the most effective gels (lowest penetration) are produced when the soap-oil ingredients are mixed in their full proportions prior to being placed in the milling apparatus. Nevertheless, it is recognized that certain advantages may accrue if less than the full proportions of oil is added initially to the fused soap so that a thicker gel is first formed, it being necessary to add the remaining oil at some later point in order to obtain the correct proportion of oil. It has also been found that certain advantages can be obtained if the oil is diluted with some solvent prior to mixing with the soap and milling. The solvent should be volatile so that it can be removed at a later point with a minimum of difficulty.

It has been found that in the making of greases by the method described herein that the ease of incorporation of the soap into the oil or the development of the gel is distinctly improved by allowing the soap to soak in the oil for a period of time prior to milling. The length of this soaking period depends on two factors; namely, the size of the soap particles and the temperature at which the soaking takes place. The smaller the soap particles the shorter the soak period need be to realize a gain. In a like manner the higher the temperature of soaking the shorter the soak period need be. In raising temperatures, however, those temperatures should be avoided which will cause the oil to develop an appreciable solubility for the soap.

Example XI

Four grams of fused lithium stearate, which was ground and sieved to be of a size held in a 28 mesh screen, was mixed with 21 grams of di-2 ethyl hexyl sebacate and allowed to soak for 19 hours at 105° C. This 16% soap oil mixture was then passed through a three roll mill twice and yielded grease having a micro penetration of 92.

Example XII

Four grams of fused lithium 12-hydroxystearate which was crudely ground by hand was intermixed with 21 grams of di-2 ethyl hexyl sebacate and the mixture was allowed to stand for 96 hours at 100° C. It was subsequently passed through a three roll paint mill 2 times. The product was a 16% soap grease having a micro penetration of 64.

Example XIII

Fused lithium stearate was mixed with a petroleum oil having a viscosity of 65 SUS at 210° F. and allowed to soak for 24 hours at 105° C. This mixture which contained 16% soap was run through three passes on the three roll mill and gave a grease with a micropenetration of 72.

Example XIV

Four grams of fused lithium stearate of a size to be held over a 42 mesh screen was mixed with 21 grams of a methyl silicone oil having a viscosity of 231 SUS at 25° C. and soaked for 95 hours at 105° C. After two passes on the three roll mill a 16% soap grease having a micropenetration of 77 resulted.

It has further been found that if a soaking step is utilized and is carried out in a volatile organic liquid or a mixture of such a liquid and the oil rather than the oil alone, the soaking time can be considerably shortened. At the same time a gain in the gelling properties is obtained as the liquid seems to act as a dispersion aid. Soak periods in the range of a few minutes are utilized with a volatile organic liquid such as benzene or acetone.

Example XV

Fused lithium stearate was placed in enough benzene so that it was just covered. After a brief soaking period a lubricating oil having a viscosity of 65 SUS at 210° F. was added to give a 16% soap in oil mixture. The entire mixture was introduced into the three roll mill for two passes. The dispersion aid evaporated during milling and the resultant grease had a micro penetration of 81.

Example XVI

The soap of Example XV was immersed in acetone and after a period of soaking, the oil of Example XV, sufficient to make a 16% soap in oil mixture, was added. After two passes on the three roll mill a grease with a micro penetration of 98 resulted. After one additional pass the grease had a micro penetration of 83.

Example XVII

The product obtained by fusing a 50–50% by weight mixture of lithium and sodium stearates was ground and sieved through a 10 mesh screen. A sample of this fused mixture was wetted with benzene, allowed to stand for a few minutes and then the oil of Example XIV was added. After 2 passes on the three roll mill a 16% soap grease having a micro penetration of 134 resulted.

It has further been found that the effectiveness of the process is in no considerable extent decreased by the presence of small amount of contaminants in the fused soaps. Rather, it is the case that the incorporation of certain minor constituents into the fused soaps can be quite effective in improving the operation of the process and the quality of the product. In the following examples it is shown that small quantities of lubricating oils incorporated into the fused soaps cause the soaps to be more readily milled into greases.

Example XVIII

A sample of lithium stearate containing 2% by weight of di-2 ethyl hexyl sebacate was fused. This fused soap was ground and added to sufficient di-2 ethyl hexyl sebacate to give a 16% soap in oil mixture. Two passes in the three roll paint mill produced a grease having a micropenetration of 102.

Example XIX

A sample of lithium stearate to which had been added 2% by weight of a petroleum oil having a viscosity of 65 SUS at 210° F., was fused. This fused soap was ground and added to sufficient of the above oil to give a 16% soap in oil mixture. Two passes through a 3 roll mill converted this mixture into a lubricating grease having a micropenetration of 82.

Other examples of the wide possible usage of this invention for gelling a variety of oils with lithium type soaps are illustrated hereafter:

Example XX

A sample of fused lithium stearate which passed a 60 mesh screen and which was held on a 100 mesh screen was wetted with benzene several moments before sufficient castor oil was added to make a 16% soap in oil mixture. The mixture was passed through a 3 roll paint mill 3 times during which the benzene evaporated. The resultant 16% grease had a micro penetration of 119.

Example XXI

A sample of fused lithium stearate of a size which passed through a 42 mesh screen and which was held on a 60 mesh screen was mixed with sufficient tri cresyl phosphate to make a 16% soap in oil mixture. After 3 passes on the 3 roll paint mill the gel had a micro penetration of 82.

Example XXII

A sample of fused lithium stearate of a size which passed a 42 mesh screen and was held on a 60 mesh screen was wetted with 1 gram of acetone a moment prior to the addition of a water soluble polyalkylene glycol oil which had a viscosity of 400 SUS at 100° F. The 16% soap in oil mixture produced a gel after 3 passes on the 3 roll mill which had a micro penetration of 111.

Example XXIII

A sample of hand crushed fused lithium myristate was added to sufficient petroleum oil, which had a viscosity of 65 SUS at 210° F., to make a 16% soap in oil mixture. After 3 passes on a 3 roll paint mill this mixture produced a grease having a micro penetration of 117.

Example XXIV

A sample of hand crushed, fused lithium laurate was wetted with a small amount of benzene and subsequently mixed with sufficient petroleum oil, which had a viscosity of 65 SUS at 210° F., to make a 16% soap in oil mixture. The mixture was milled on a 3 roll paint mill and after 2 passes had a micro penetration of 68, and after 3 passes a micro penetration of 65.

Example XXV

A sample of fused lithium stearate which passed a 42 mesh screen and was held on a 60 mesh screen was wetted with benzene and mixed with sufficient amount of a petroleum oil having a viscosity of 150 SUS at 210° F. in order to make a 16% soap in oil mixture. After 2 passes on a 3 roll mill the resultant greases had a micro penetration of 69 and after 3 passes—62. On standing for 24 hours this sample set up to a micro penetration of 52.

Example XXVI

Fused calcium stearate was placed in enough benzene so that it was just covered. After soaking for ten minutes a lubricating oil having a viscosity of 65 SUS at 210° F. was added to give a 16% soap in oil mixture. The entire mixture was introduced into a 3 roll mill for 2 passes. The dispersion aid evaporated during milling and the resultant grease had a micropenetration of 185.

The foregoing detailed description has set forth some of the soaps which may be used in carrying out the invention. Generally, these soaps may come from the group of alkali metal, alkaline earth metal, heavy metal soaps or mixtures thereof including the soaps of the metals lithium, sodium, potassium, aluminum, strontium, calcium, barium, magnesium, lead, rubidium, caesium and others. They may be soaps of high molecular weight saturated or unsaturated carboxylic acids having in the range of 10–20 carbon atoms such as the soaps of lauric acid, stearic acid, hydroxy stearic acid, palmitic acid, myristic acid, oleic acid or any of the natural or synthetic fatty acids or mixtures of fatty acids including hydrogenated fatty acids or of non-fatty acids types such as naphthenic acids and rosin acids.

Obviously many modifications and variations of the present invention are possible in the light of the above teachings. It is therefore to be understood that within the scope of the appended claims the invention may be practiced otherwise than as specifically described.

What is claimed is:

1. A method of making gels comprising the step of fusing a metallic soap gelling agent, cooling the fused soap gelling agent, and then mixing and milling the fused soap gelling agent and the normally liquid oleaginous vehicle to be gelled until the desired gel results.

2. The method of claim 1 wherein the soap gelling agent is soaked in the normally liquid oleaginous vehicle to be gelled after mixing and prior to milling.

3. A method of making gels comprising the step of fusing a metallic soap gelling agent, cooling the fused soap gelling agent, soaking the fused soap gelling agent in a volatile dispersion aid, then mixing in the normally liquid oleaginous vehicle to be gelled, and milling this final mixture until the desired gel results.

4. A method of making soap base greases comprising the step of heating a metallic soap until it fuses, cooling the fused soap, mixing a lubricating oil with the fused soap and milling the mixture until a grease results.

5. The method of claim 4 wherein the soap is taken from the group consisting of lithium stearate, barium stearate, strontium stearate, aluminum mono stearate, lithium 12-hydroxy stearate, lithium myristate, lithium laurate, sodium stearate, and calcium stearate.

6. The method of claim 4 wherein the soap is taken from the group consisting of mixtures of lithium and sodium stearate, barium and sodium stearate, lithium and calcium stearate, and sodium and calcium stearate.

7. The method of claim 4 wherein the lubricating oil is taken from the group consisting of mineral oils, synthetic lubricating oils and vegetable oils.

8. The method of claim 4 wherein the soap after fusion is soaked in a volatile hydrocarbon prior to mixing with the lubricating oil.

9. The method of making a soap base grease comprising heating a metallic soap until it fuses as indicated by a change in its physical appearance, cooling the fused soap, grinding the soap to reduce the particle size, mixing a lubricating oil with the ground fused soap and milling the mixture until a grease results.

10. The method of making a soap base grease comprising mixing 0–15% of lubricating oil with a metallic soap, heating the soap-lubricating oil mixture until the soap fuses, cooling the fused soap grinding the fused soap, adding additional lubricating oil and milling the final mixture until a grease results.

References Cited in the file of this patent

UNITED STATES PATENTS

| | | |
|---|---|---|
| 1,943,806 | Becker et al. | Jan. 16, 1934 |
| 2,311,772 | Parker | Feb. 23, 1943 |
| 2,446,177 | Hain et al. | Aug. 3, 1948 |
| 2,636,001 | Browning et al. | Apr. 21 1953 |
| 2,704,363 | Armstrong | Mar. 15, 1955 |

OTHER REFERENCES

The Manufacture and Application of Lubricating Greases, Boner, Reinhold Pub. Corp., N. Y. (1954), pages 12, 255 and 256.